(No Model.) 2 Sheets—Sheet 1.
G. W. SWARTZ.
CONVERTER SYSTEM FOR ELECTRIC RAILWAYS.
No. 532,113. Patented Jan. 8, 1895.
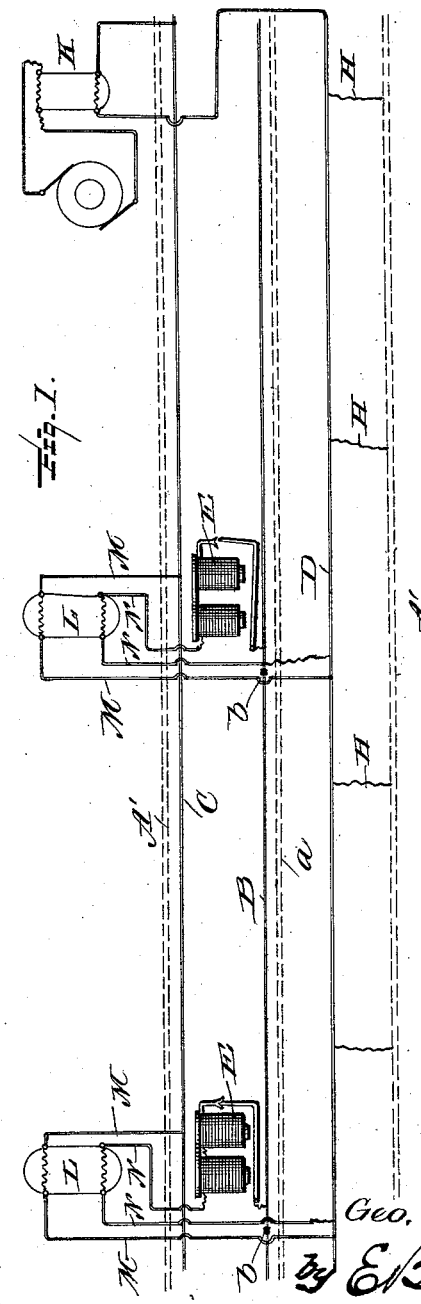
Witnesses:
L. C. Hills
E. A. Bond
Inventor:
Geo. W. Swartz
by E. B. Stocking
Attorney (No Model.) 2 Sheets—Sheet 2.
G. W. SWARTZ.
CONVERTER SYSTEM FOR ELECTRIC RAILWAYS.
No. 532,113. Patented Jan. 8, 1895.
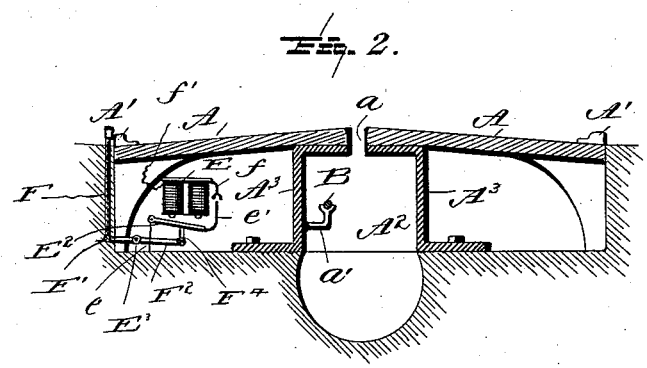
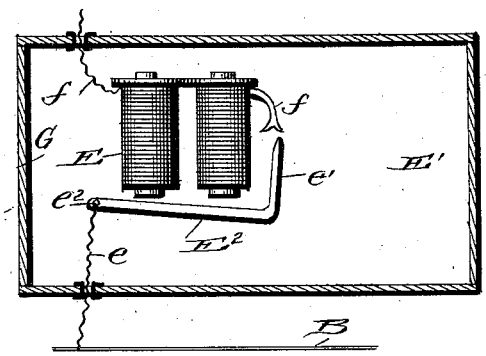
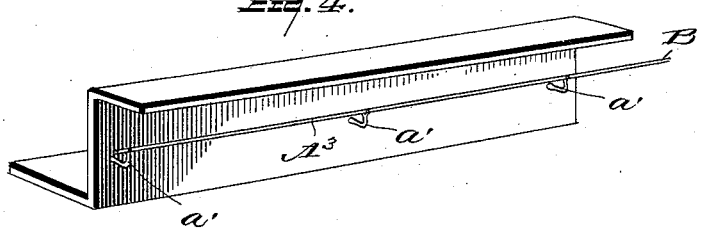
Witnesses:
L. C. Hills
E. R. Bond
Inventor:
Geo. W. Swartz,
by E. B. Stocking
Attorney

UNITED STATES PATENT OFFICE.

GEORGE W. SWARTZ, OF FLORENCE, ALABAMA.

CONVERTER SYSTEM FOR ELECTRIC RAILWAYS.

SPECIFICATION forming part of Letters Patent No. 532,113, dated January 8, 1895.

Application filed October 12, 1893. Serial No. 487,990. (No model.)

*To all whom it may concern:*

Be it known that I, GEORGE W. SWARTZ, a citizen of the United States, residing at Florence, in the county of Lauderdale, State of Alabama, have invented certain new and useful Improvements in Electric-Railway Systems, of which the following is a specification, reference being had therein to the accompanying drawings.

This invention relates to certain new and useful improvements in electric railways in which the cars are propelled by a current of electricity from a generating machine.

It has for its objects among others to provide a simple and cheaply constructed system adapted to high or low tension, which will not leak current to the ground and in which the conductors are so placed that the public cannot come in contact with the high voltage apparatus nor does the car have anything to do with the high voltage, the high voltage being only used to carry the current long distances in the main, and when it comes in the circuit in the conduit it is low voltage and perfectly safe. I bury the conductors under ground and insulate the same their entire length by insulating materials that will allow the same to be buried under the ground and not leak the current from said conductors. I bury a positive conductor parallel with the track. This conductor is perfectly insulated and may be of any well known construction such as is generally used in underground electric light systems for the cables. There is a positive and a negative cable. I also place in a conduit a bare conductor in sections of say one hundred feet, more or less, and fasten this bare conductor to insulating brackets in a conduit. To this bare conductor is connected an insulated wire, attached to the armature of a magnet, which magnet is arranged so that its armature will contact with the circuit that passes around the coils of the magnet, and the other end of this magnet wire is connected to the buried insulated cable circuit. This magnet is placed in a perfectly water tight or proof box or housing located in the conduit, or it may be placed above ground in a box arranged to be attached to a pole, say at street corners. Manholes are preferably provided at the points where these boxes are located so as to provide easy access thereto when desired. The bare conductor is separated by insulators at every hundred feet, more or less, and at every hundred feet, more or less, is one of these boxes containing an electro magnet. As the car passes along the trolley comes in contact with the bare wire, the circuit is closed for the one hundred feet, more or less, by the rising of the armature, the current flows through the coil of the magnet and attracts the armature and holds it up until the car has passed that section of one hundred feet, more or less, and as the section is passed the armature is released and the next armature is attracted and another section is brought in circuit, and so on throughout the length of the whole line. Various ways may be provided for closing the circuit of each section. Other accessories will be provided as required and some of them will be fully explained farther on.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1 is a diagrammatic view of my system adapted for high voltage for long distance transmission. Fig. 2 is a vertical section transversely of the conduit. Fig. 3 is a similar view of the magnet and armature employed at the end of each section. Fig. 4 is a perspective view of one of the sections of the wall of the conduit with its insulated brackets.

Like letters of reference indicate like parts throughout the several views in which they appear.

Referring now to the details of the drawings by letter, A designates the road-bed and A' the rails upon which the wheels of the car are designed to travel.

$a$ is the slot and $A^2$ the conduit within which the bare conductor is located.

$A^3$ are substantially Z-shaped metallic supports forming the sides of the conduit and upon the upper horizontal portions of which the road-bed is supported. The lower horizontal portions are secured in position in any suitable manner. Projecting from the vertical wall of one of these supports are the brackets $a'$ which are properly insulated, and in or on these brackets is supported the bare conductor B which is in sections of one hundred feet, more or less, as may be found most expedient, the said bare conductor being separated by insulation at the predetermined points of separation. The insulation is shown at $b$ in Fig. 1.

C is the main or positive conductor or circuit properly insulated and buried underground, and D is the return or negative conductor or circuit.

At or near each break in the bare conductor I arrange a magnet E which is preferably located in a conduit or underground and in a waterproof box or housing $E'$ as seen in Fig. 3, manholes not shown being provided for easy access thereto when desired.

$E^2$ is the armature of this magnet and it is connected by insulated wire $e$ with the bare conductor as seen in Figs. 1 and 3. This armature has a right-angled extension $e'$ as seen in said Figs. 1 and 3 which is adapted to engage the forked contact point $f$ on the magnet and which is connected with the magnet wire, the other end of which is connected as at $f'$ with the main circuit C as shown in Fig. 1. The armature is pivoted at one end as at $e^3$ and the magnets are preferably arranged vertically so that the armature will fall away from the magnet as soon as the circuit is broken. This avoids the employment of a spring for this purpose.

With the parts thus arranged the operation will be substantially as follows:—as the car passes along, the trolley (not shown) will come in contact with the bare wire B, and the circuit is closed for the section by the raising of the armature; the current flows through the coil of the magnet E and holds up the armature until the car has passed that section and onto the next, when the armature is released and the armature of the magnet of the next section is attracted and thus that section is brought into circuit, and so on throughout the whole length of the line.

In Fig. 2 I have shown a mechanical closer for closing the circuit of each section. It is designed to be actuated by the wheel of the motor car, which coming in contact with the upper end of the vertically-disposed rod F depresses the same, and the lower end of this rod is pivotally connected at $F'$ with the horizontally-disposed lever $F^2$ which is pivoted at $F^3$ and its other end provided with an upwardly-extending portion $F^4$ arranged beneath the armature $E^2$ so that when the rod is depressed the armature is forced upward bringing the contacts $e'$ and $f$ together so the current can flow to the trolley and then to the motor. The instant the cable circuit is closed by the pressing of the armature of the magnet the armature is then held by the magnetic attraction of the magnet until the car passes that section when the current is cut out from the said section and the armature is released and drops and opens that section, and no current is in that section until another car comes along. At such time the section is closed and the motor and the section is again supplied with current, and so on through the whole operation of the road. It will be observed that in this mode of construction there is no current in the feeder or trolley wire except at such sections as the car and trolley are passing over. H is a wire, there being one arranged at say from seven to twenty feet apart, and connected with the return conductor D and with the rail for the purpose of returning the current that passes through the motor and conveyed by a suitable contact brush to the rail, and thus through the leading wires to the cable, and back to the negative terminal of the generator.

Fig. 1 illustrates the construction adapted to high voltage for long distance transmission. C is the insulated cable; D, the return circuit cable, and B the bare conductor separated at intervals of one hundred feet, more or less, by insulation $b$. E are the circuit maintaining magnets and H the feeders connected to the rail and thence to the return circuit as described in connection with Fig. 1. K is a step-up transformer to raise the voltage to the required electro-motive force. L is a step-down transformer to reduce the voltage to low tension. M is the primary circuit wire from the main circuit to the transformer, and N is the secondary wire that passes to the magnet circuit and through the bare conductor.

While I have described my improvements in connection with an underground system it will be readily understood that it is as applicable to overhead systems if it be desired to so use the same.

What I claim as new is—

In a system of electrical distribution for railways, the combination of a bare conductor in sections insulated from each other, an outgoing circuit, a return circuit, and transformers each having its primary permanently inserted between the outgoing and return circuits, and having one pole of its secondary connected to a section of the bare conductor and the other pole to the rails, and a switch included in one of these connections, having an electro-magnet which is traversed by the secondary circuit when closed and the armature of which constitutes the movable switch member, whereby the secondary coil and coil of the switch magnet are in series, as set forth.

In testimony whereof I affix my signature in presence of two witnesses.

GEORGE W. SWARTZ.

Witnesses:
A. G. NEYLEY,
E. C. CROW.